(12) United States Patent
Evers et al.

(10) Patent No.: US 10,316,790 B2
(45) Date of Patent: Jun. 11, 2019

(54) PISTON RING-BELT STRUCTURAL REINFORCEMENT VIA ADDITIVE MACHINING

(71) Applicant: Federal-Mogul Corporation, Southfield, MI (US)

(72) Inventors: Ross Evers, Tecumseh, MI (US); Rainer Weiss, Nürnberg (DE); Sven Ungermann, Nürnberg (DE)

(73) Assignee: TennecoInc., Lake Forest, IL (US)

( * ) Notice: Subject to any disclaimer, the term of this patent is extended or adjusted under 35 U.S.C. 154(b) by 216 days.

(21) Appl. No.: 15/277,443

(22) Filed: Sep. 27, 2016

(65) Prior Publication Data

US 2018/0087470 A1    Mar. 29, 2018

(51) Int. Cl.
| | |
|---|---|
| *F02F 3/00* | (2006.01) |
| *F02F 3/02* | (2006.01) |
| *F02F 3/22* | (2006.01) |
| *F02F 3/26* | (2006.01) |
| *B33Y 10/00* | (2015.01) |

(Continued)

(52) U.S. Cl.
CPC ............ *F02F 3/0015* (2013.01); *B23K 9/044* (2013.01); *B23K 10/027* (2013.01); *B23K 26/342* (2015.10); *B33Y 10/00* (2014.12); *B33Y 80/00* (2014.12); *C23C 4/129* (2016.01); *C23C 4/134* (2016.01); *F02F 3/003* (2013.01); *F02F 3/0084* (2013.01); *F02F 3/02* (2013.01);
(Continued)

(58) Field of Classification Search
CPC .. F02F 3/0014; F02F 3/02; F02F 3/027; F02F 3/04; F02F 3/042; F02F 3/08

USPC ........................................................... 92/176
See application file for complete search history.

(56) References Cited

U.S. PATENT DOCUMENTS

| | | | |
|---|---|---|---|
| 2,874,009 A | 2/1959 | Peterson et al. | |
| 4,986,167 A * | 1/1991 | Stratton | F01P 3/18 123/193.6 |

(Continued)

FOREIGN PATENT DOCUMENTS

| | | |
|---|---|---|
| DE | 3643039 A1 | 6/1988 |
| DE | 102008055848 A1 | 5/2010 |

OTHER PUBLICATIONS

International Search Report, dated Dec. 6, 2017 (PCT/US2017/052363).

*Primary Examiner* — F Daniel Lopez
*Assistant Examiner* — Daniel S Collins
(74) *Attorney, Agent, or Firm* — Robert L. Stearns; Dickinson Wright, PLLC

(57) ABSTRACT

A piston including at least one insert disposed between an inner surface of a ring belt and undercrown surface, and/or between the inner surface of the ring belt and a pin boss, to provide reinforcement to the ring belt is provided. The insert reduces thermal and mechanical distortion of the ring belt, and thus increases the piston ring performance, reduces blow-by, and ultimately improves engine emissions. The insert is formed by an additive machining process, such as direct depositing, laser cladding, laser sintering, arc welding, additive welding, plasma transferred arc spraying, plasma welding, arc welding, selective laser sintering, and high velocity oxygen fuel spraying, plasma spraying. According to one embodiment, an intermediate piece is mechanically attached to the piston, and the insert is applied to the intermediate piece, to provide additional reinforcement.

18 Claims, 4 Drawing Sheets

(51) Int. Cl.

| | |
|---|---|
| *B33Y 80/00* | (2015.01) |
| *B23K 26/342* | (2014.01) |
| *B23K 9/04* | (2006.01) |
| *B23K 10/02* | (2006.01) |
| *C23C 4/134* | (2016.01) |
| *C23C 4/129* | (2016.01) |
| *F02F 3/08* | (2006.01) |
| *B23K 101/00* | (2006.01) |

(52) U.S. Cl.
CPC .................. *F02F 3/08* (2013.01); *F02F 3/22* (2013.01); *F02F 3/26* (2013.01); *B23K 2101/003* (2018.08)

(56) References Cited

U.S. PATENT DOCUMENTS

| | | |
|---|---|---|
| 5,052,280 A | 10/1991 | Kopf et al. |
| 9,127,616 B2 | 9/2015 | Weinenger et al. |
| 2002/0056367 A1* | 5/2002 | Bochart .................. B23P 15/10 92/239 |
| 2007/0074695 A1 | 4/2007 | Gildemeister et al. |
| 2010/0139480 A1 | 6/2010 | Ohmori et al. |
| 2011/0197758 A1 | 8/2011 | Lapp et al. |
| 2011/0265744 A1 | 11/2011 | Allig et al. |
| 2014/0299091 A1 | 10/2014 | Ribeiro et al. |
| 2015/0247474 A1 | 9/2015 | Evers et al. |
| 2015/0315995 A1 | 11/2015 | Weinenger |

\* cited by examiner

PISTON RING-BELT STRUCTURAL REINFORCEMENT VIA ADDITIVE MACHINING

BACKGROUND OF THE INVENTION

1. Field of the Invention

This invention relates generally to pistons for internal combustion engines, and methods for manufacturing the pistons.

2. Related Art

Engine manufacturers are encountering increasing demands to improve engine efficiencies and performance, including, but not limited to, improving fuel economy, reducing oil consumption, improving fuel systems, increasing compression loads and operating temperatures within the cylinder bores, reducing heat loss through the piston, improving lubrication of component parts, decreasing engine weight and making engines more compact, while at the same time decreasing the costs associated with manufacture.

In order to provide a piston with reduced weight, reduced manufacturing costs, and reduced compression height, the pistons are often designed as a single-piece without a closed cooling gallery along an undercrown surface. These pistons are typically referred to as "galleryless" pistons. Another type of piston designed to provide specific performance includes a two-piece design, for example a steel crown and aluminum skirt. These pistons are typically referred to as "articulated" pistons.

Both galleryless pistons and articulated pistons typically include an unsupported ring belt, in which case there is no structure extending from the ring belt to another portion of the piston to support the ring belt. Although the piston design with the unsupported ring belt provides numerous advantages, such as weight reduction, manufacturing process simplification, and cost reduction, the piston with the unsupported ring belt could experience blow-by. The blow-by is typically a result of improper compression ring seating due to thermal and mechanical distortion of the ring belt geometry and includes leakage of an air-fuel mixture or combustion gases between the piston and the cylinder wall into the crankcase.

SUMMARY OF THE INVENTION

One aspect of the invention comprises a piston for an internal combustion engine. The piston includes an insert providing for reduced thermal and mechanical distortion of a ring belt, and thus increased piston ring performance, reduced blow-by, and ultimately improved engine emissions. The piston includes a body formed of a metal material. The body includes an upper combustion surface and an oppositely facing undercrown surface. The body also includes a ring belt extending from the upper combustion surface and having a plurality of ring grooves. The body also includes a pair of pin bosses extending from the undercrown surface. The piston further includes the insert extending radially from an inner surface of the ring belt to the undercrown surface or radially from an inner surface of the ring belt to one of the pin bosses for supporting the ring belt. The insert is formed by an additive machining process.

Another aspect of the invention provides a method of manufacturing a piston for an internal combustion engine which includes an insert providing for a reduced thermal and mechanical distortion of a ring belt, and thus increased piston ring performance, reduced blow-by, and ultimately improved engine emissions. The method includes providing a body formed of a metal material, the body including an upper combustion surface and an oppositely facing undercrown surface, the body including a ring belt having a plurality of ring grooves and extending from the upper combustion surface, and the body including a pair of pin bosses extending from the undercrown surface. The method further includes forming the insert extending radially from an inner surface of the ring belt to the undercrown surface or radially from the inner surface of the ring belt to one of the pin bosses for supporting the ring belt. The step of forming the insert includes an additive machining process.

BRIEF DESCRIPTION OF THE DRAWINGS

Other advantages of the present invention will be readily appreciated, as the same becomes better understood by reference to the following detailed description when considered in connection with the accompanying drawing wherein.

DETAILED DESCRIPTION OF EXAMPLE EMBODIMENTS

Figure 1:
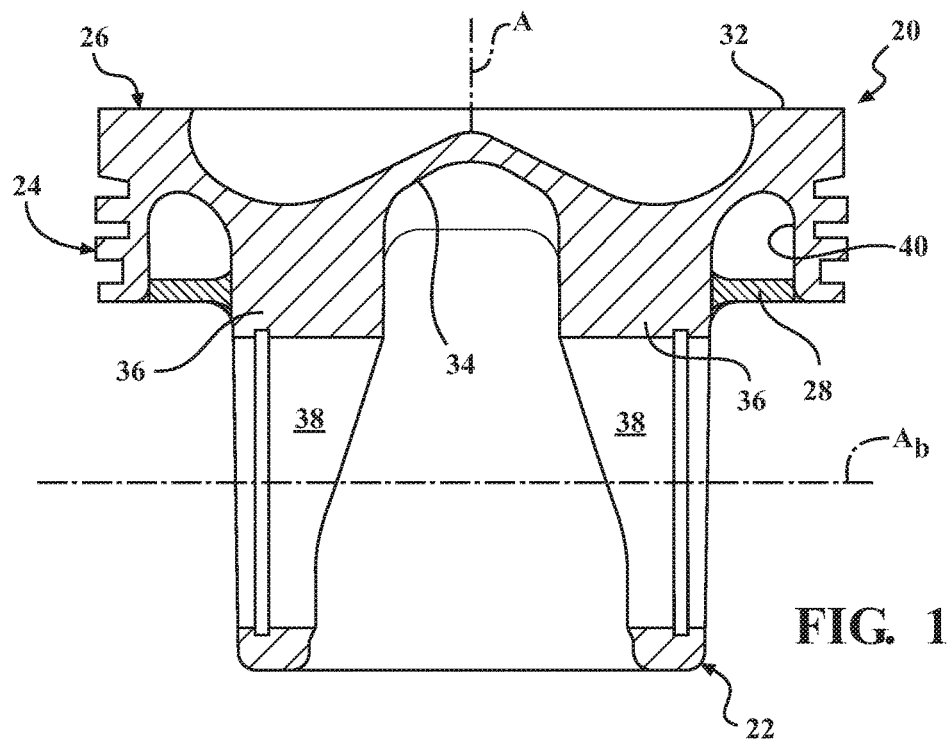
FIG. 1 is a side cross-sectional view of a piston according to an example embodiment which includes a pair of inserts.
Figure 2:
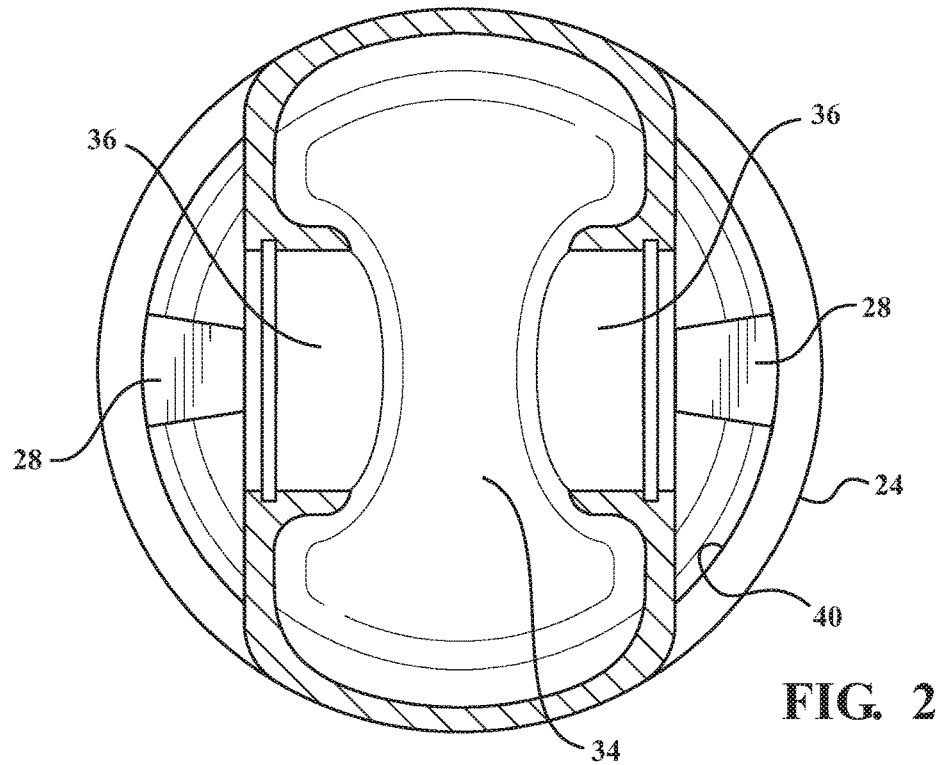
FIG. 2 is a bottom view of the piston of FIG. 1.
Figure 3:
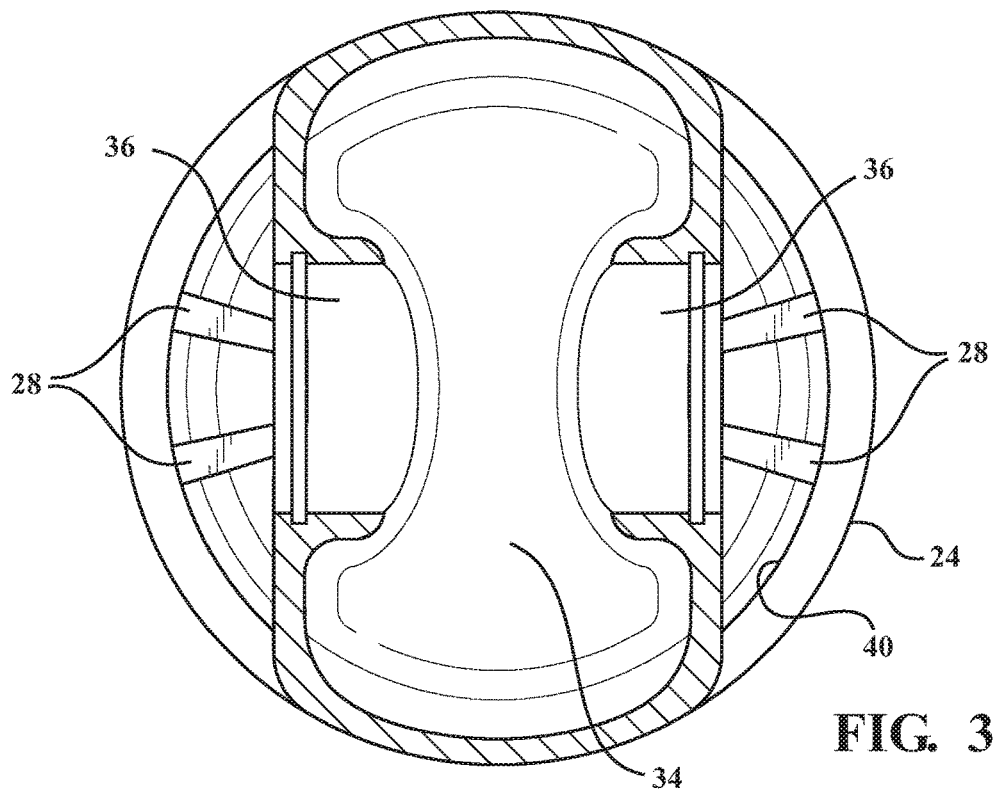
FIG. 3 is a bottom view of a piston according to another example embodiment which includes two pairs of inserts.
Figure 4A:
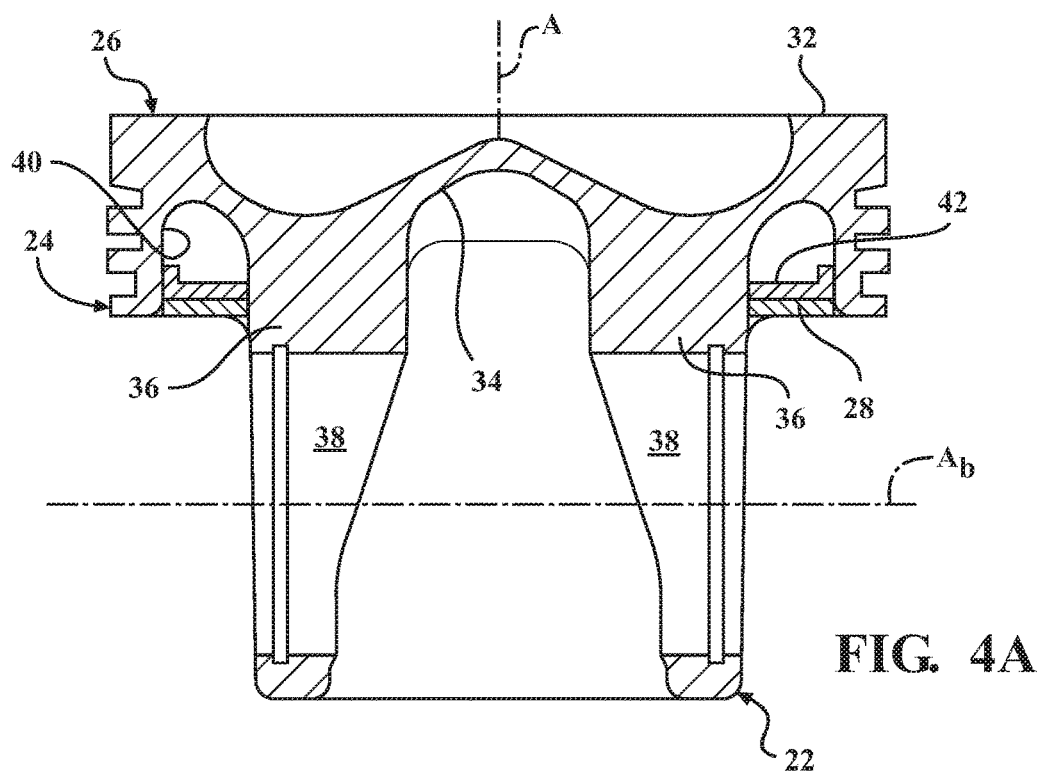
FIG. 4A is a side cross-sectional view along a pin bore axis of a piston including two pairs of inserts each formed on an intermediate piece according to another example embodiment.
Figure 4B:
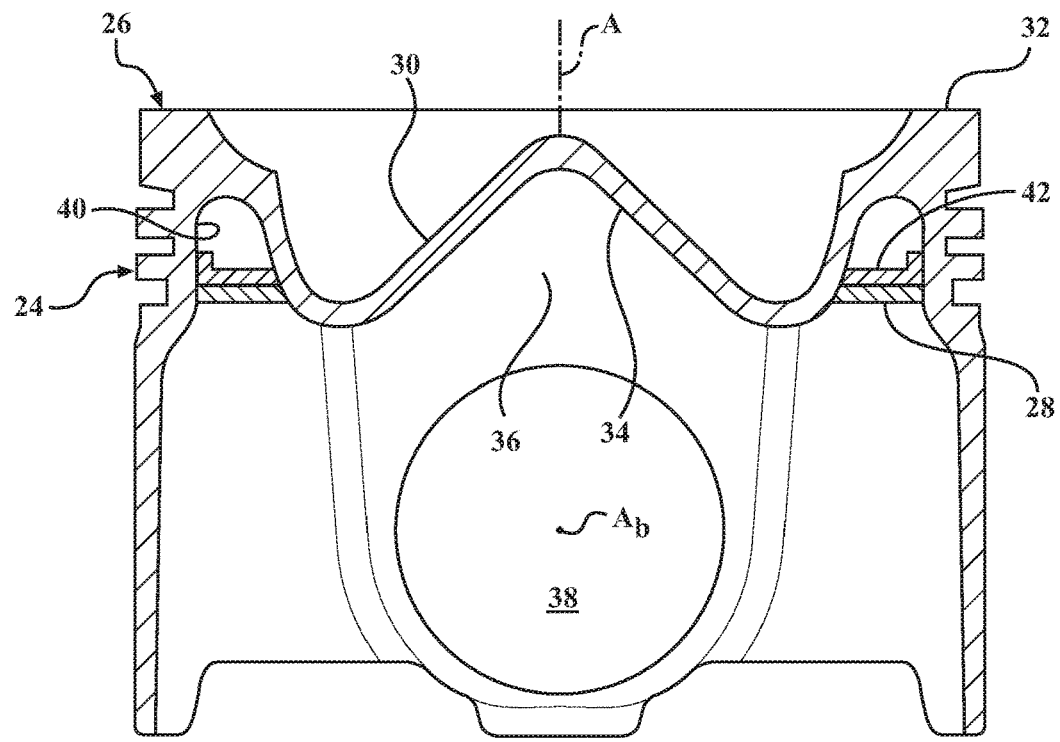
FIG. 4B is a side cross-sectional view along a thrust axis of the piston of FIG. 4A.
Figure 4C:
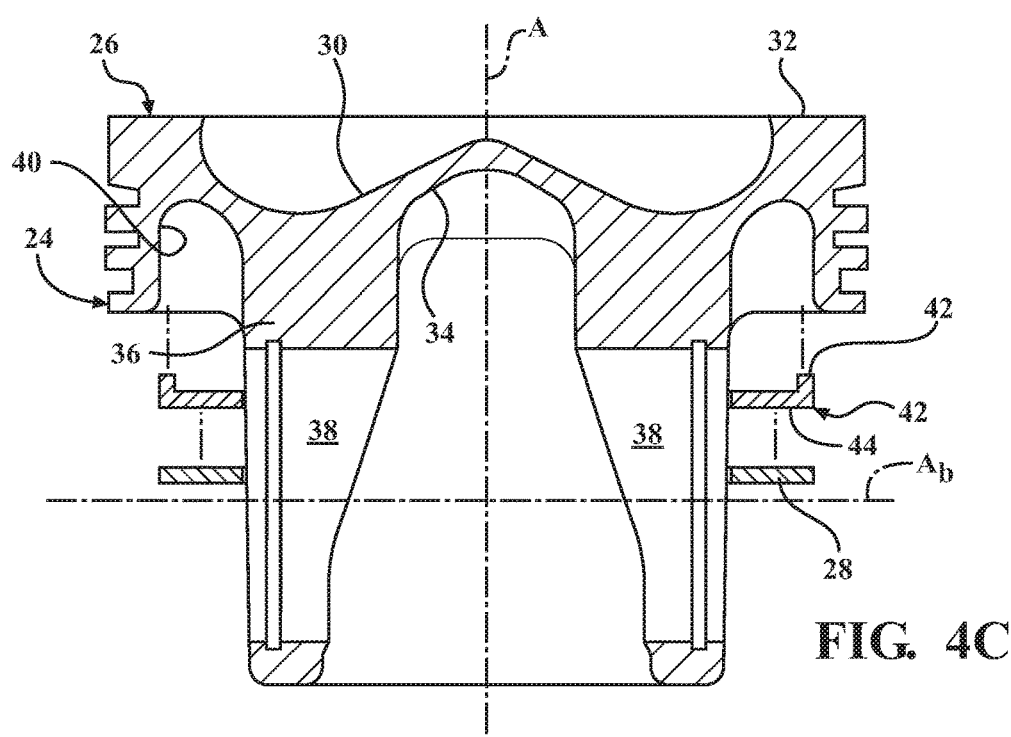
FIG. 4C is a side cross-sectional view of the piston of FIG. 4A showing an exploded view of the inserts and intermediate pieces.
Figure 4D:
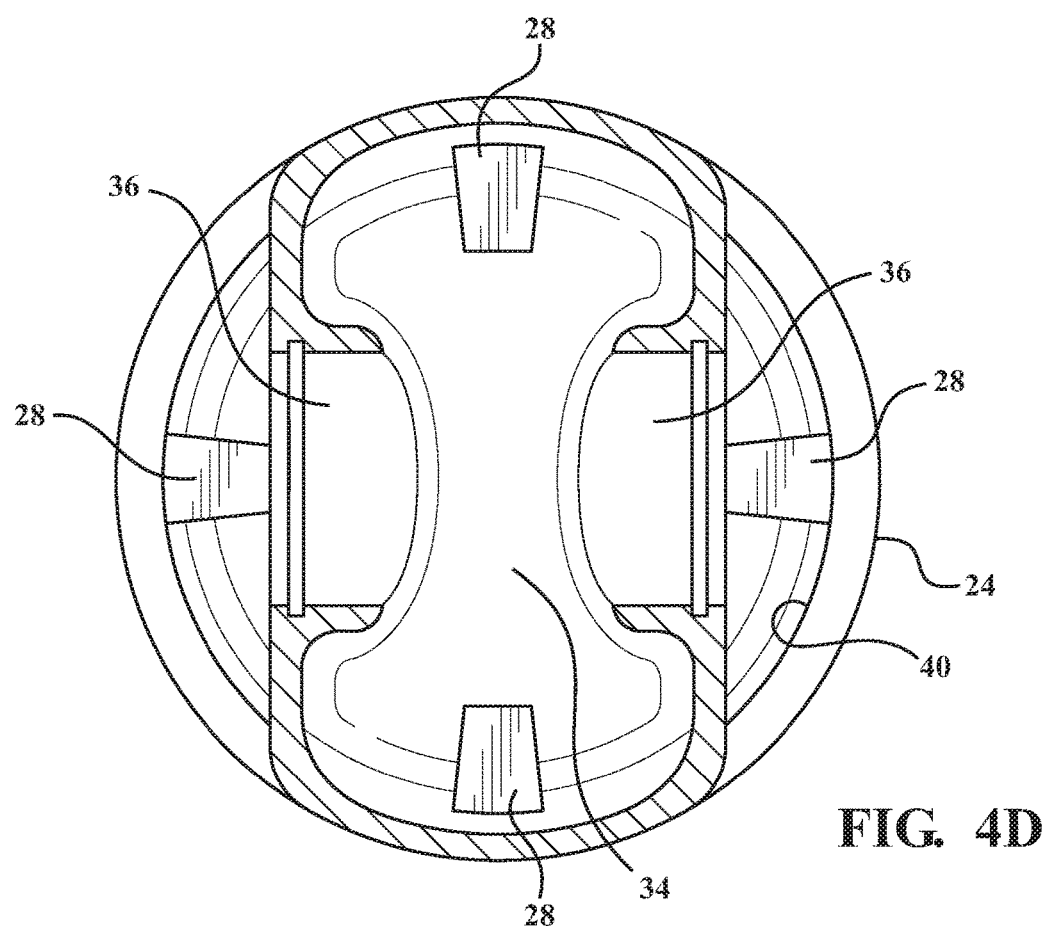
FIG. 4D is a bottom view of the piston of FIG. 4A.

A piston 20 for an internal combustion engine according to example embodiments is generally shown in FIGS. 1-4D. The piston 20 comprises a body 22 with a ring belt 24 extending form an upper combustion surface 26, and an insert 28 formed by an additive machining process. The insert 28 supports the ring belt and thus provides for reduced thermal and mechanical distortion of the ring belt 24, and thus increased piston ring performance, reduced blow-by, and ultimately improved engine emissions.

The body 22 of the piston 20 is formed of a first material, which is typically from a steel material, an aluminum-based material, and cast iron. In the example embodiments, the body 22 of the piston 20 is a single-piece and is referred to as a galleryless piston. Alternatively, the body 22 of the piston 20 can be designed as a two-piece articulated piston, or the body 22 could have another design.

The body 22 includes the upper combustion surface 26 surrounding a center axis A for exposure to a combustion chamber, and the upper combustion surface 26 includes a combustion bowl 30 surrounded by an outer rim 32. The body 22 also includes an undercrown surface 34 facing opposite the upper combustion surface 26. The ring belt 24 of the body 22 extends from the outer rim 32 of the upper combustion surface 26 and longitudinally relative to the center axis A. The ring belt 24 also has a plurality of ring grooves facing away from the center axis A. In the example embodiment, wherein the piston 20 is a galleryless piston, the body 22 is free of a closed cooling gallery located along the undercrown surface 34 or the ring belt 24. The body 22 of the piston 20 also includes a pair of pin bosses 36 disposed diametrically opposite one another. The pin bosses 36 extend from the undercrown surface 34 and longitudinal relative to the center axis A. Each of the pin bosses 36 includes a pin bore 38 surrounding a pin bore axis $A_b$.

The piston 20 includes at least one of the inserts 28, also referred to as a supporting rib or structural web, formed by the additive machining process, and preferably at least one pair of the inserts 28 or a plurality of the inserts 28, to support the ring belt 24. The support provided to the ring belt 24 by the inserts 28 reduces thermal and mechanical distortion of the ring belt 24, and thus increases piston ring performance, reduces blow-by, and ultimately improves engine emissions. The location and geometry of the inserts 28 typically depends on the degree of reinforcement required. For example, the annular arc length could be varied. Also, the location of the inserts 28 is typically dictated by the geometry of the body 22 of the piston 20 and engine loading conditions.

The inserts 28 are formed of a second material, and the second material is typically selected from a nickel-chrome alloy, a titanium alloy, and a steel materiel, such as low carbon steel, alloy steel, tool steel, and stainless steel. The second material is typically different from the first material, but the first and second materials could be the same. Each of the inserts 28 extends radially and continuously from an inner surface 40 of the ring belt 24 to the undercrown surface 34 or radially and continuously from an inner surface 40 of the ring belt 24 to one of the pin bosses 36.

When the piston 20 includes the pair of inserts 28, the inserts 28 are typically disposed diametrically opposite one another. In the example embodiment of FIGS. 1 and 2, the piston 20 includes a pair of the inserts 28 disposed diametrically opposite one another along the pin bore axis $A_b$. The piston 20 could also include a second set of inserts 28 disposed diametrical opposite one another along a thrust axis $A_t$. In the example embodiment of FIG. 3, the piston 20 includes two pairs of the inserts 28, and each pair is disposed diametrically opposite one another but angularly offset from the pin bore axis $A_b$. In the example embodiment of FIGS. 4A-4D, the piston 20 also two pairs of the inserts 28 each disposed diametrically opposite one another. One pair of the inserts 28 is located along the pin bore axis $A_b$ and the other pair is disposed along the thrust axis $A_t$.

Various different additive machining processes can be used to form the inserts. For example, the additive machining process can include at least one of direct depositing laser cladding, laser sintering, arc welding, additive welding, plasma transferred arc spraying, plasma welding, arc welding, selective laser sintering, high velocity oxygen fuel spraying, and plasma spraying the second material on the first material of the piston body 22. According to one example embodiment, the second material used to form the inserts 28 is directly deposited on the first material of the body 22, which allows the geometry of the inserts 28 be formed by free form fabrication.

The piston 20 can also include an intermediate piece 42 formed of a third material to support the insert 28, as shown in the example of FIGS. 4A-4D. The intermediate piece 42 pre-defines the reinforcement geometry of the insert 28 to allow for a high volume deposition process. The third material used to form the intermediate piece 42 typically depends on the first material used to form the body 22 of the piston 20, and the degree of structural reinforcement required. For example, the third material can be selected from low carbon steel, alloy steel, tool steel, stainless steel, nickel-chrome alloy, and titanium alloy. The third material could be the same as the first and/or second materials, or different from the first and/or second materials.

The intermediate piece 42 is mechanically attached to the body 22 before the inert 28 is formed by the additive machining process. The geometry and location of the intermediate piece 42 can vary depending on the desired geometry and location of the inserts 28. In the example embodiment of FIGS. 4A-4D, the intermediate piece 42 includes a base wall 44 disposed perpendicular to the center axis A of the piston 20 and extending between the inner surface 40 of the ring belt 24 and the undercrown surface 34 or pin boss 26. The intermediate piece 42 of this example embodiment also includes a side wall 46 disposed parallel to the center axis A and extending from the base wall 44 upwardly along the inner surface 40 of the ring belt 24.

When the piston 20 includes the intermediate piece 42, the insert 28 can be applied to the intermediate piece 42 by various different additive machining processes. For example the additive machining process can include at least one of direct depositing, laser cladding, laser sintering, arc welding, additive welding, plasma transferred arc spraying, plasma welding, arc welding, selective laser sintering, high velocity oxygen fuel spraying, and plasma spraying the second material on the third material of the intermediate piece. Typically, the process includes at least one of laser cladding, plasma transferred arc spraying, plasma welding, arc welding, selective laser sintering, high velocity oxygen fuel spraying, and plasma spraying the second material on the third material of the intermediate piece 42. As a result of the additive machining process, the intermediate piece 42 would ultimately remain in place, fully integrated into the resultant piston structure.

Another aspect of the invention is a method of manufacturing the piston 20. The method includes providing the body 22 formed of the first material. Various different methods can be used to form the body 22 of the piston 20, such as casting, forging, or another method.

Next, the method includes forming the insert 28 of the second material on the body 22 of the piston 20. The step of forming the insert 28 includes an additive machining process, such as at least one of direct depositing, laser cladding, laser sintering, arc welding, additive welding, plasma transferred arc spraying, plasma welding, arc welding, selective laser sintering, high velocity oxygen fuel spraying, and plasma spraying the second material. For example, when the body 22 is formed of the first materiel, the additive machining process can include direct depositing the second material on the first material of the piston body 22. The step of forming the insert 28 typically includes extending the insert 28 continuously from the inner surface 40 of the ring belt 24 to a portion of the undercrown surface 24 located between the pin bosses 26, or extending the insert 28 continuously from the inner surface 40 of the ring belt 24 to one of the pin bosses 26. According to one embodiment, the method includes forming a plurality of the inserts 28.

According to one embodiment, the method includes mechanically attaching the intermediate piece 42 formed of the third material to the body 22 of the piston 20 for additional reinforcement prior to applying the inert 24. Once the intermediate piece 42 is attached, the method includes applying the second material to the third material, for example by laser cladding, plasma transferred arc spraying, plasma welding, arc welding, selective laser sintering, high velocity oxygen fuel spraying, and plasma spraying the second material on the third material.

Many modifications and variations of the present invention are possible in light of the above teachings and may be practiced otherwise than as specifically described while within the scope of the invention.

The invention claimed is:

1. A piston, comprising:
a body formed of a metal material, said body including an upper combustion surface and an oppositely facing undercrown surface;
said body including a ring belt extending from the upper combustion surface, the ring belt having a plurality of ring grooves;
said body including a pair of pin bosses extending from said undercrown surface;
an intermediate piece extending radially from an inner surface of said ring belt to said undercrown surface or one of said pin bosses, said intermediate piece being mechanically attached to said inner surface of said ring belt, and said intermediate piece being mechanically attached to said undercrown surface or one of said pin bosses;
an insert extending radially from an inner surface of said ring belt to said undercrown surface or radially from an inner surface of said ring belt to one of said pin bosses for supporting said ring belt, said insert being formed by an additive machining process, and said insert being formed on said intermediate piece.

2. The piston of claim 1, wherein said insert extends continuously from said inner surface of said ring belt to a portion of said undercrown surface located between said pin bosses.

3. The piston of claim 2, wherein said insert extends continuously from said inner surface of said ring belt to one of said pin bosses.

4. The piston of claim 1 including a plurality of said inserts each extending from said ring belt to said undercrown surface or one of said pin bosses.

5. The piston of claim 1 including at least one pair of said inserts, said inserts being disposed diametrically opposite one another.

6. The piston of claim 1, wherein said body is formed of a first material, said first material is selected from a steel material, an aluminum-based material, and cast iron; said insert is formed of a second material, and said second material is selected from a steel material, a nickel-chrome alloy, and a titanium alloy.

7. The piston of claim 1, wherein said piston is free of a closed cooling gallery along said undercrown surface.

8. The piston of claim 1, wherein said insert increases the strength of said ring belt of said piston compared to the strength of a ring belt of a piston having the same design except without said insert.

9. The piston of claim 1, wherein each of said pin bosses includes a pin bore surrounding a pin bore axis, and wherein the piston includes a pair of said inserts disposed diametrically opposite one another, said inserts are located along said pin bore axis and each extends radially from said ring belt to one of said pin bosses.

10. The piston of claim 1, wherein each of said pin bosses includes a pin bore surrounding a pin bore axis, and wherein said piston includes a pair of said inserts disposed diametrically opposite one another, said inserts are angularly offset of said pin bore axis and each extends radially from said ring belt to one of said pin bosses.

11. A piston for an internal combustion engine, comprising:
a body formed of a first material, said first material being selected from a steel material, an aluminum-based material, and cast iron;
said body including an upper combustion surface surrounding a center axis for exposure to a combustion chamber, said upper combustion surface including a combustion bowl surrounded by an outer rim;
said body including an undercrown surface facing opposite said upper combustion surface;
said body including a ring belt extending from said outer rim of said upper combustion surface and longitudinally relative to said center axis, said ring belt having a plurality of ring grooves facing away from said center axis;
said body being free of a closed cooling gallery located along said undercrown surface or said ring belt;
said body including a pair of pin bosses disposed diametrically opposite one another, said pin bosses extending from said undercrown surface and longitudinal relative to said center axis, each of said pin bosses including a pin bore surrounding a pin bore axis;
an intermediate piece extending radially from an inner surface of said ring belt to said undercrown surface or one of said pin bosses, said intermediate piece being mechanically attached to said inner surface of said ring belt, and said intermediate piece being mechanically attached to said undercrown surface or one of said pin bosses;
at least one pair of inserts for supporting said ring belt, said inserts being formed of a second material, and said second material being selected from a steel material, a nickel-chrome alloy, and a titanium alloy;
said inserts being diametrically opposite one another, and each of said inserts extending radially and continuously from an inner surface of said ring belt to said undercrown surface or radially and continuously from an inner surface of said ring belt to one of said pin bosses, and one of said inserts being formed on said intermediate piece;
said insert being formed by an additive machining process, and the additive machining process being selected from direct depositing, laser cladding, laser sintering, arc welding, additive welding, laser sintering, arc welding, additive welding, plasma transferred arc spraying, plasma welding, arc welding, selective laser sintering, and high velocity oxygen fuel spraying, plasma spraying said second material.

12. A method of manufacturing a piston, comprising the steps of:
providing a body formed of a metal material, the body including an upper combustion surface and an oppositely facing undercrown surface, the body including a ring belt having a plurality of ring grooves and extending from the upper combustion surface, and the body include a pair of pin bosses extending from the undercrown surface;
mechanically attaching an intermediate piece to the body, the intermediate piece extending radially from the inner surface of the ring belt to the undercrown surface or radially from the inner surface of the ring belt to one of the pin bosses;
forming an insert extending radially from an inner surface of the ring belt to the undercrown surface or radially from the inner surface of the ring belt to one of the pin bosses for supporting the ring belt; and the step of forming the insert including applying the insert to the intermediate piece by an additive machining process.

13. The method of claim 12, wherein the additive machining process includes at least one of direct depositing, laser cladding, laser sintering, arc welding, additive welding, plasma transferred arc spraying, plasma welding, arc welding, selective laser sintering, high velocity oxygen fuel spraying, and plasma spraying a material.

14. The method of claim 12, wherein the step of forming the insert includes extending the insert continuously from the inner surface of the ring belt to a portion of the undercrown surface located between the pin bosses.

15. The method of claim 12, wherein the step of forming the insert includes extending the insert continuously from the inner surface of the ring belt to one of the pin bosses.

16. The method of claim 12 including forming a plurality of the inserts.

17. The method of claim 12, wherein the body is formed of a first material, the first material is selected from a steel material, an aluminum-based material, and cast iron; the insert is formed of a second material, and the second material is selected from a steel material, a nickel-chrome alloy, and a titanium alloy.

18. The method of claim 12, wherein the body of the piston is formed of a first material, and the additive machining process includes direct depositing a second material on the first material of the piston body.

\* \* \* \* \*